United States Patent Office 3,481,865
Patented Dec. 2, 1969

3,481,865
REMOVAL OF IMPURITIES FROM AROMATIC OILS AND TARS
Sherwood C. Samuels, Jr., Bartlesville, Okla., assignor to Phillips Petroleum Company, a corporation of Delaware
No Drawing. Filed Sept. 26, 1966, Ser. No. 581,759
Int. Cl. C10g 21/06
U.S. Cl. 208—251
9 Claims

ABSTRACT OF THE DISCLOSURE

Undesirable metal-containing and asphaltic impurities may be removed from aromatic oil and tar feedstock used for the production of carbon black by diluting with an aromatic solvent such as benzene, toluene or xylene and removing said impurities by a suitable means such as by centrifuging or filtering. The treated oil containing the aromatic solvent is a desirable carbon black feedstock.

---

This invention relates to aromatic oils and tars. In one aspect it relates to a process for the removal of contaminants from aromatic oils and tars to be used as carbon black feed stock.

Heavy aromatic oils and tars frequently contain particulate matter such as metals and high molecular weight contaminants such as organometallic compounds which produce inferior quality carbon black. Alkali metals change the structure of the carbon black and these and other metals, such as vanadium, iron, calcium and magnesium, exert deleterious effects on the refractories used in a carbon black reactor.

Several processes have been employed in the past for treating heavy oils used as carbon black feed stock to remove contaminants. It has been found in using solvents for this purpose that cyclic oils do not reject enough of the asphaltic constituents which are detrimental to carbon black quality, and aliphatic solvents reject some constituents which are desirable as carbon black feed stocks.

Another difficulty experienced in the treatment of heavy aromatic oils used as carbon black feed stocks to remove contaminants by the use of a solvent has been the necessity of removing the solvent from the carbon black feed stock prior to introducing the feed stock into the carbon black reactor.

An object of my invention is to remove contaminants from aromatic oils and tars.

Another object of my invention is to remove undesirable contaminants from aromatic oils and tars without rejecting their desirable constituents.

Other aspects, objects and advantages of the invention will be apparent to one skilled in the art from the written description and the claims.

According to my invention undesirable contaminants of heavy aromatic oils or tar, i.e. feed stock, are removed by mixing the feed stock with an aromatic solvent which peptizes and conglomerates the large molecular structure impurities including a majority of metal-containing structures. The metal-containing structures can be organo-metallic compounds when the metal constituent can be potassium, sodium, nickel, vanadium, iron, calcium and silicon. Conglomeration as used in the present application is used to mean coagulation and/or agglomeration. The peptized conglomerates solids are then removed from the mixture of feed stock and solvent by suitable means such as by centrifuging or filtering the mixture. The feed stock containing the aromatic solvent can be introduced directly into a carbon black reactor without the need of separation of the solvent from the feed stock. Aromatic solvent as used in the present application is used to mean aromatic concentrates and aromatic compounds.

The term aromatic oil or tar as used in the present application refers to an oil or tar having a high concentration of aromatic compounds therein as indicated by a BMCI value (U.S. Bureau of Mines Correlation Index) of at least 75. Preferably the aromatic oil will have a BMCI value within the range of 100–150.

Aromatic concentrates such as petroleum fractions containing at least 50 percent by volume aromatic compounds and boiling from within the range of about 176 to about 600° F., preferably 200 to 400° F., can be employed to peptize and conglomerate undesirable contaminants in the aromatic oil or tar feed stock. Aromatic concentrate can be employed at the rate of at least one part by volume of aromatic concentrate to three parts by volume of aromatic oil or tar. Suitable results can be obtained where the volume of aromatic concentrate, and the volume of aromatic oil is a 1:1 ratio. After the aromatic concentrate has peptized and conglomerated the undesirable contaminants, the mixture is centrifuged to separate the conglomerated contaminants. After separation of the conglomerated contaminants the aromatic oil or tar containing the aromatic concentrate can be introduced directly as a carbon black feed stock into the carbon black reactor without the removal of the aromatic concentrate therefrom.

Aromatic components can also be used according to this invention for removal of undesirable contaminants of aromatic oils or tars. Aromatic compounds which can be used as a solvent are represented by the general formula

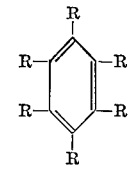

where R is selected from the group consisting of H and alkyl wherein the total carbon atoms in R groups is not more than 3. The aromatic compound can be employed at the rate of at least one part by volume aromatic compound to three parts by volume of aromatic oil or tar. Suitable results have been obtained where the volume of aromatic compound and the volume of aromatic oil or tar are present in a 1:1 ratio.

Representative aromatic compounds useful in the practice of this invention are benzene, methyl benzene (toluene), 1,3 - dimethylbenzene, 1,2 - dimethylbenzene, 1-methyl-2-ethylbenzene, 1-methyl-4 - ethylbenzene, n - propylbenzene, i - propylbenzene, 1,2,4 - trimethylbenzene, 1,3,5-trimethylbenzene, and ethylbenzene. The aromatic compounds which I prefer to use are those of benzene, toluene, and xylene.

The choice of the solvent, i.e. whether an aromatic compound or an aromatic concentrate should be used, depends on the nature of the feed stock. For heavy tars containing more than 20 percent pentane insolubles an aromatic compound is preferred. For determining the amount of pentane insoluble present in a heavy tar a two gram sample of the tar is placed in a 100 ml. test tube and about 5 ml. of benzene are added to disperse the sample. About 95 ml. of n-pentane are then added to the test tube to fill the test tube. The mixture thus formed is then centrifuged and the insolubles that are centrifuged out are washed with n-pentane to remove all oil. The insoluble portion is then dried and weighed to determine the percentage of pentane insolubles present.

The aromatic oil utilized in the present application had the properties set forth in Table I below:

TABLE I

Oil feedstock

| | |
|---|---|
| API gravity at 60° F. | −4.2 |
| ASTM vacuum distillation, percent condensed: | |
| 2 | 472 |
| 10 | 498 |
| 30 | 582 |
| 50 | 709 |
| 60 | 792 |
| 70 | Cracked |
| 80 | — |
| UOP K | 9.4 |
| BMCI | 145 |
| Viscosity, SUS at 100° F. | 769.4 |
| Viscosity, SUS at 210° F. | 57.16 |
| Pentane insolubles, wt. percent (CX–56R) | 27.5 |
| Carbon residue, wt. percent | 20.3 |
| Ash, wt. percent | 0.16 |
| Mol wt. | 241 |
| S, wt. percent | 0.63 |
| C, wt. percent | 91.3 |
| H, wt. percent | 6.6 |
| K, p.p.m. | 20 |
| Na, p.p.m. | 46 |
| Ni, p.p.m. | 6.4 |
| V, p.p.m. | 1.7 |
| Fe, p.p.m. | 250 |
| Ca, p.p.m. | 52 |
| Si, p.p.m. | 230 |

EXAMPLE I

A sample of the aromatic oil having the properties disclosed in Table I was admixed with toluene to form a solution. Equal volumes of toluene and the aromatic oil were used. The oil had a BMCI value of 145 which is indicative of a high aromaticity. The solution containing the oil and the toluene was stirred while the solution was heated to a temperature ranging from 150° F. 175° F. to reduce the viscosity of the solution. The solution was then centrifuged for 10 minutes. The solution was again heated and centrifuged to remove the conglomerated metallic contaminants. The solution was then removed and the effectiveness of the separation is shown by the following comparison of untreated feedstock and treated feedstock.

| Contaminant: | Untreated Oil Amount Present Before Treatment | Treated Oil Amount Present After Treatment |
|---|---|---|
| Potassium, p.p.m. | 20 | <2 |
| Sodium, p.p.m. | 46 | <2 |
| Nickel, p.p.m. | 6.4 | 4 |
| Vanadium, p.p.m. | 1.7 | <2 |
| Iron, p.p.m. | 250 | 18 |
| Calcium, p.p.m. | 52 | 18 |
| Silicon, p.p.m. | 230 | 40 |

Ten percent of the oil was removed as toluene-insoluble materials. The remainder of the oil and toluene solution was such as could be used directly as a carbon black feedstock without the removal of the toluene.

I claim:

1. A process for removing metal-containing and asphaltic contaminants from an aromatic feedstock for the production of carbon black comprising contacting said aromatic feedstock having a BMCI value of at least 75 with an aromatic solvent to form a solution and to cause conglomeration of said contaminants, wherein said aromatic solvent is represented by the formula

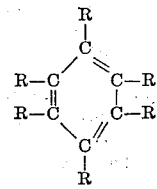

where R is selected from the group consisting of H and alkyl and the total carbon atoms in R groups is not more than 3, and removing the conglomerated contaminants from said mixture to form a carbon black feedstock of reduced impurities.

2. A process according to claim 1 wherein said solution is heated to a temperature within the range of 150–175° F. thus reducing the viscosity of said solution.

3. A process according to claim 1 wherein said aromatic solvent is toluene.

4. A process according to claim 1 wherein said aromatic feedstock is contacted with an aromatic concentrate fraction boiling within the range of 176°–600° F., said aromatic concentrate containing at least 50% by volume aromatic compounds.

5. A process according to claim 1 wherein said contaminants are predominantly organo-metallic compounds.

6. A process according to claim 5 wherein the metals in said organo-metallic compounds are selected from the group consisting of potassium, sodium, nickel, vanadium, iron, calcium and silicon.

7. A process according to claim 1 wherein said aromatic feedstock has a BMCI value in the range of about 100–150.

8. A process according to claim 1 wherein said contaminants are removed from said mixture by centrifugation.

9. A process according to claim 1 wherein said contaminants are removed from said mixture by filtration.

References Cited

UNITED STATES PATENTS

| 2,906,693 | 9/1959 | Donaldson | 208—87 |
| 2,846,358 | 8/1958 | Bieber et al. | 196—3 |
| 2,895,902 | 7/1959 | Peet | 208—73 |
| 3,281,350 | 10/1966 | Codet | 208—62 |
| 2,899,373 | 8/1959 | Steeves | 208—39 |
| 3,167,500 | 1/1965 | Payne | 208—251 |

DELBERT E. GANTZ, Primary Examiner

J. M. NELSON, Assistant Examiner

U.S. Cl. X.R.

208—86, 309